Patented May 24, 1927.

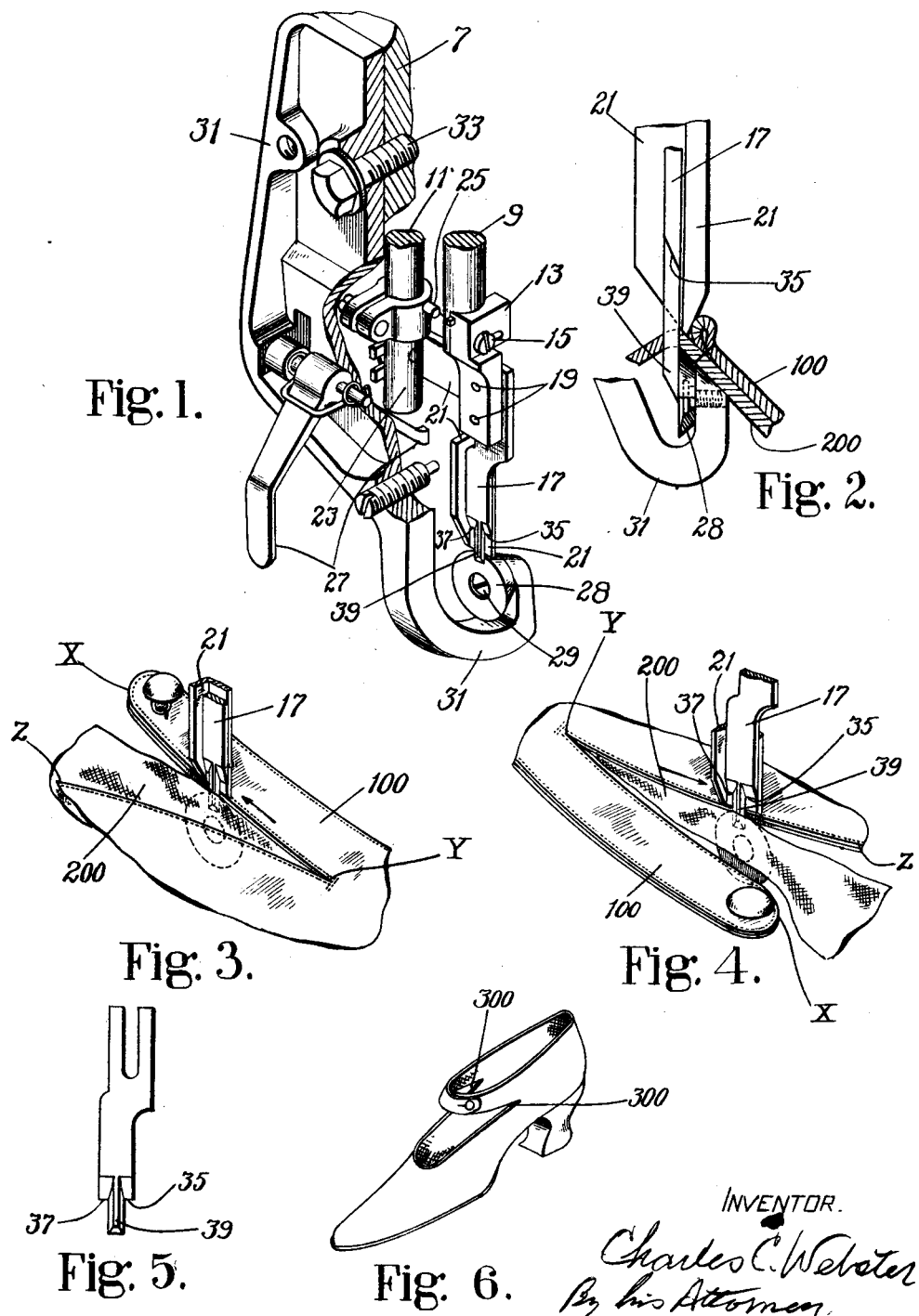

1,629,560

UNITED STATES PATENT OFFICE.

CHARLES C. WEBSTER, OF HAVERHILL, MASSACHUSETTS, ASSIGNOR TO UNITED SHOE MACHINERY CORPORATION, OF PATERSON, NEW JERSEY, A CORPORATION OF NEW JERSEY.

LINING-TRIMMING MACHINE.

Application filed May 1, 1924. Serial No. 710,440.

This invention relates to cutting machines and is herein illustrated as embodied in a machine for trimming the linings of boots and shoes.

In the manufacture of certain kinds of shoes, for example ladies' pumps, it is customary to leave part of the lining projecting from the edge of the upper and to trim off this projecting part after the shoe is otherwise complete. It is also customary to provide ornamental openings in the upper, to attach the lining and upper by stitches which extend along the edges of the openings in the upper, and later—usually in the packing-room when the shoe is otherwise complete—to cut out those portions of the lining which are exposed by the ornamental openings in the upper.

In either case, there are frequently encountered openings or indentations portions of which are V-shaped, across which the lining extends and from which it must be trimmed.

One type of machine heretofore used to trim boot and shoe linings comprises a chisel-shaped trimming cutter having a pilot projecting from one end of its cutting edge to puncture the lining prior to the actual trimming operation of the cutter. This pilot is not withdrawn from the lining while the cutter is operating, since it is utilized also to guide the cutting edge to a sharp shearing edge of a work support or cutting block across which the trimming cutter is reciprocated. Consequently, since the trimming cutter has only one cutting edge and has a pilot at one end of said edge, the feeding of the work can progress in only one direction, because the lining must be cut in advance of the pilot to be fed past the latter.

According to the present invention, the trimming cutter is provided, as formerly, with a pilot, but the latter, instead of being located at one side of the cutter, is located in the middle and the cutter has two cutting edges extending laterally in opposite directions from the pilot. With a cutter of this form one of said cutting edges will do the trimming if the work is fed in one direction and the other will do the trimming if the work is fed in the opposite direction. Thus, in trimming a lining along two edges of an upper forming an angular notch the work may be fed to cause the trimming to progress into the notch along both sides of the latter, since one of the cutting edges of the cutter will precede the pilot into the notch at one side and the other cutting edge will precede the pilot into the notch at the other side. This duplex feature of the trimming cutter therefore provides for an improved mode of trimming by which sharply defined and clean-cut angular notches may be cut in the lining.

This and other features of the invention, including certain details of construction and combinations of parts, will be described as embodied in an illustrative machine and pointed out in the appended claims.

Referring now to the accompanying drawings,

Figure 1 is a perspective of a portion of a machine in which the present invention is embodied.

Figure 2 is a front elevation of the work-engaging parts of the machine, a piece of work being shown in cross-section in process of being operation upon.

Figures 3 and 4 show in perspective the cutting of the lining which extends beneath a V-shaped opening in an upper.

Figure 5 is an elevation of the cutter, and

Figure 6 is a perspective of a shoe of a type in which a narrow indentation such as that shown in Figures 3 and 4 occurs.

The machine comprises an overhanging arm, a portion of which is shown at 7. In vertical bearings (not shown) in this arm are slidably mounted two rods 9 and 11. To the lower end of the rod 9 a block 13 is adjustably fastened by a screw 15 and to the block a cutter 17 is adjustably fastened by screws 19. On the lower portion of the rod 11, the stem of a combined guard and gage 21 is fastened by a screw 23. The cutter rod 9 is reciprocated by mechanism, not shown, and may be raised and brought to rest at any time. When so raised it carries with it the rod 11 and gage 21, by reason of the contact of the farther end of the screw 15 with the under side of the a pin 25 carried by a collar which is fast to a collar on the rod 11. This raising of the cutter and gage is for the purpose of facilitating the presentation of the work to the machine. The gage 21 may be raised independently of the cutter when desired (for example when a seam in the lining is encountered) by pushing on the handle of a bell-crank lever 27, one arm of which extends beneath rod 11. The reciprocating cutter 17 cooperates with a shear member 28 in the form of a frustum of a cone which is rotatable about the axis of a screw 29 threaded into a bracket 31, said bracket being fastened to the overhanging arm of the machine by a cap screw 33.

The rotatable shear member is shown, described and claimed in application Serial No. 657,442, filed Aug. 14, 1923, in the name of Smith, said application being assigned to the same assignee as is the present application. The remainder of the machine, which has been briefly described above, except for the cutter and gage, is or may be substantially the same as the machine of Patent No. 1,406,335, granted February 14, 1922, upon an application filed in the name of Boulton, and will not be further described. It will be understood, however, that the work is fed by the operator over the shear member 28 with the gage 21 in contact with the edge of the upper 100, and that the lining 200 is severed by the reciprocating cutter.

In the patented machine, the reciprocating cutter is provided with an extension or pilot which runs in contact with the vertical face of the shear member and is also provided with only one cutting edge located at that side of the pilot which is nearer the operator. With such a construction, the work must always be fed away from the operator, and, when an indentation is encountered, the work must be so fed that the cut proceeds along one side of the indentation toward the apex and then along the other side of the indentation away from the apex. Referring now to Figure 6, in which is shown a shoe having two substantially V-shaped indentations 300 in the upper, it will be seen that it is difficult if not impossible to turn the shoe, when the apex of the V has been reached, in such manner as to cause the lining to be cut cleanly out of said apex.

In order to provide for cutting the lining from these and similar indentations, the cutter 17 of the present machine is provided with two cutting edges 35, 37, between which the pilot 39 is located. With this construction, the machine will cut whether the work is fed away from or toward the operator,— that is in either direction in the line of the cutting edges 35, 37. When, therefore, a V-shaped indentation such as that shown in the figures is encountered, the operator may proceed as shown in Figures 3 and 4. Considering the indentation only and starting at the point marked X, the work is fed away from the operator while the cut progresses from point X to point Y as shown in Figure 3. The work is then withdrawn, turned approximately half way around and fed toward the operator, as shown in Figure 4, to cut from the point Z to the point Y, the arrows in Figures 3 and 4 indicating the directions in which the work is fed. It should be noted that the edge of the upper in each case may be held in contact with the edge gage 21 and that the two cuts will progress into the indentation and meet at the apex of the V whereby the lining is cut out precisely according to the contour of the indentation in the upper.

Although the invention has been described in connection with cutting the lining from an indentation in the top of a shoe, it should be understood that it is equally applicable to the cutting out of the so-called "panels" which occur when ornamental openings of closed outline are present in the upper and that the invention is not limited in the scope of its application to the particular machine which has been shown and described.

Having thus described my invention, what I claim as new and desire to secure by Letters Patent of the United States is:—

1. A lining-trimming machine comprising a work-supporting member having a shearing edge, a trimming cutter having a pilot portion and two cutting edges extending in opposite directions from said pilot portion, and mechanism arranged to reciprocate said cutter so that said cutting edges and said pilot portion will move across and in contact with said shearing edge of said work-supporting member.

2. A machine for severing the lining which extends across an opening in the upper of a shoe having, in combination, means adapted to extend into the shoe and to support the upper and lining at the desired locality, said means including a shear member, and a reciprocating cutter having a pilot adapted to run in contact with a face of the shear member and having two alined cutting edges located respectively one on one side of the pilot and one on the other whereby the lining may be severed progressively while the shoe is fed either toward the operator or away from him in the direction of extent of said cutting edges.

3. A machine for severing the lining which extends across an opening in the upper of a shoe, a portion of which opening is V-shaped, having, in combination, a shear member, a reciprocating cutter having a pilot adapted to run in contact with a face of the shear member, and an edge gage located at one side of the cutter in position to engage the edge of the opening, said cutter comprising two cutting edges located on opposite sides of the pilot whereby the lining along one leg of the V may be severed by one cutting edge while the work is being fed in one direction with respect to the cutter, and the lining along the other leg may be severed while the work is being fed in the opposite direction, the gage being maintained during both severing operations in contact with the edge of the opening.

In testimony whereof I have signed my name to this specification.

CHARLES C. WEBSTER.